United States Patent
Takeoka et al.

(10) Patent No.: US 9,133,895 B2
(45) Date of Patent: Sep. 15, 2015

(54) VEHICLE FRONT STRUCTURE

(71) Applicants: Kazuki Takeoka, Toyota (JP); Hitoshi Yoshimura, Okazaki (JP); Tadasu Tomohiro, Toyota (JP); Shohei Tsukada, Anjo (JP)

(72) Inventors: Kazuki Takeoka, Toyota (JP); Hitoshi Yoshimura, Okazaki (JP); Tadasu Tomohiro, Toyota (JP); Shohei Tsukada, Anjo (JP)

(73) Assignees: Toyota Jidosha Kabushiki Kaisha, Toyota-shi, Aichi-ken (JP); VTEC Co., Ltd., Anjo, Aichi (JP)

( * ) Notice: Subject to any disclaimer, the term of this patent is extended or adjusted under 35 U.S.C. 154(b) by 0 days.

(21) Appl. No.: 14/342,120

(22) PCT Filed: Dec. 10, 2012

(86) PCT No.: PCT/IB2012/002646
§ 371 (c)(1),
(2) Date: Feb. 28, 2014

(87) PCT Pub. No.: WO2013/088222
PCT Pub. Date: Jun. 20, 2013

(65) Prior Publication Data
US 2014/0318924 A1    Oct. 30, 2014

(30) Foreign Application Priority Data

Dec. 14, 2011  (JP) ................................ 2011-273832

(51) Int. Cl.
*B60K 28/10*   (2006.01)
*F16D 23/12*   (2006.01)
*B60R 19/02*   (2006.01)
(Continued)

(52) U.S. Cl.
CPC .............. *F16D 23/12* (2013.01); *B60K 23/02* (2013.01); *B60R 19/02* (2013.01); *B60R 21/09* (2013.01); *B60R 21/38* (2013.01); *F16C 1/12* (2013.01); *G05G 1/323* (2013.01)

(58) Field of Classification Search
CPC .............................. B60R 21/38; B60R 19/02
USPC ......................................... 180/274, 277, 278
See application file for complete search history.

(56) References Cited

U.S. PATENT DOCUMENTS 3,789,967 A * 2/1974 Dau et al. ................. 192/111.12
4,266,649 A * 5/1981 Falzoni .................... 192/70.252
(Continued)

FOREIGN PATENT DOCUMENTS

JP           10246289 A  *  9/1998
JP           10-310035       11/1998
(Continued)

*Primary Examiner* — Faye M Fleming
(74) *Attorney, Agent, or Firm* — Finnegan, Henderson, Farabow, Garrett & Dunner, LLP (57) ABSTRACT

A vehicle front structure includes a cable member, one end portion of which is connected to a clutch pedal and the other end portion of which is detachably held by a retaining member arranged between an engine and a wall-like member arranged in front, in a vehicle longitudinal direction, of the engine, the cable member being arranged running across in back, in the vehicle longitudinal direction, of the wall-like member, and a protruding pressing member that is provided on a wall surface that faces a rear, in the vehicle longitudinal direction, of the wall-like member so as to face the cable member, and that detaches the other end portion of the cable member from the retaining member by pushing the cable member toward the rear in the vehicle longitudinal direction when a load is input from the front of the vehicle in the vehicle longitudinal direction.

9 Claims, 11 Drawing Sheets (51) Int. Cl.
*B60R 21/38* (2011.01)
*B60K 23/02* (2006.01)
*B60R 21/09* (2006.01)
*G05G 1/323* (2008.04)
*F16C 1/12* (2006.01)

(56) References Cited

U.S. PATENT DOCUMENTS

| | | | |
|---|---|---|---|
| 4,381,053 A * | 4/1983 | Hyodo | 192/70.252 |
| 4,779,713 A * | 10/1988 | Tomala et al. | 192/85.15 |
| 6,109,164 A | 8/2000 | Okuhara et al. | |
| 2002/0070605 A1 | 6/2002 | Ono | |
| 2003/0019320 A1 | 1/2003 | Thistleton et al. | |
| 2005/0045406 A1 * | 3/2005 | Miyoshi | 180/274 |
| 2007/0137915 A1 | 6/2007 | Sanagi et al. | |
| 2008/0142333 A1 * | 6/2008 | Song | 192/89.2 |

FOREIGN PATENT DOCUMENTS

| | | | |
|---|---|---|---|
| JP | 2002-178893 | | 6/2002 |
| JP | 2003-54390 | | 2/2003 |
| JP | 2003-112616 | | 4/2003 |
| JP | 2007-84009 | | 4/2007 |
| JP | 2007-106318 | | 4/2007 |
| JP | 2008064237 A | * | 3/2008 |
| JP | 2012149737 A | * | 8/2012 |
| JP | 2013125418 A | * | 6/2013 |
| JP | 2014108678 A | * | 6/2014 |

* cited by examiner

VEHICLE FRONT STRUCTURE

CROSS-REFERENCE TO RELATED APPLICATIONS

This application is a national phase application of International Application No. PCT/IB2012/002646, filed Dec. 10, 2012, and claims the priority of Japanese Application No. 2011-273832, filed Dec. 14, 2011, the content of both of which is incorporated herein by reference.

BACKGROUND OF THE INVENTION

1. Field of the Invention

The invention relates to a vehicle front structure.

2. Description of the Related Art

Japanese Patent Application Publication No. 2002-178893 (JP 2002-178893 A), for example, describes a structure in which a master cylinder is provided so as to be able to rock (i.e., move) with a vehicle width direction as an axial direction, and in which the master cylinder is mechanically connected to a clutch pedal via a push rod. This structure inhibits the clutch pedal from moving backward (toward the rear in a vehicle longitudinal direction) by having the master cylinder rock when a load is input from the front of the vehicle in the vehicle longitudinal direction, such as when a frontal collision of the vehicle or the like occurs.

However, with this structure, it takes time to rock the master cylinder immediately after a collision. Therefore, there is still room for improvement with a structure that shortens the time that it takes to inhibit backward movement of the clutch pedal immediately after a collision.

SUMMARY OF THE INVENTION

Therefore, in view of the foregoing problem, the invention thus provides a vehicle front structure capable of shortening the time that it takes to inhibit backward movement of a clutch pedal immediately after a load is input from the front of the vehicle in the vehicle longitudinal direction.

One aspect of the invention relates to a vehicle front structure that includes a cable member, one end portion of which is connected to a clutch pedal and the other end portion of which is detachably held by a retaining member arranged between an engine and a wall-like member arranged in front, in a vehicle longitudinal direction, of the engine, the cable member being arranged running across in back, in the vehicle longitudinal direction, of the wall-like member; and a protruding pressing member that is provided on a wall surface that faces a rear, in the vehicle longitudinal direction, of the wall-like member so as to face the cable member, and that detaches the other end portion of the cable member from the retaining member by pushing the cable member toward the rear in the vehicle longitudinal direction when a load is input from the front of the vehicle in the vehicle longitudinal direction.

In this vehicle front structure, when a load is input from the front of the vehicle in the vehicle longitudinal direction, such as when the vehicle is involved in a frontal collision, the protruding pressing member that is provided on a wall surface that faces the rear, in the vehicle longitudinal direction, of the wall-like member moves toward the rear in the vehicle longitudinal direction and pushes the cable member toward the rear in the vehicle longitudinal direction, such that the other end portion of the cable member detaches from the retaining member. Therefore, the clutch pedal is released immediately after the load is input (i.e., in the early stages of the collision) and thus able to move forward in the vehicle longitudinal direction by its own weight. That is, according to the invention, the time from immediately after a load is input from the front of the vehicle in the vehicle longitudinal direction until backward movement of the clutch pedal is inhibited is able to be shortened.

In the vehicle front structure described above, the pressing member may be formed in a triangular shape in a top sectional view, with a rear portion thereof in the vehicle longitudinal direction being an apex.

According to this structure, the pressing member is formed in a triangular shape in a top sectional view, with a rear portion thereof in the vehicle longitudinal direction being an apex, so even if the direction in which the pressing member moves toward the rear (i.e., moves backward) in the vehicle longitudinal direction varies depending on the manner in which the frontal collision occurs (i.e., the manner in which the load is input from the front of the vehicle body), the cable member is able to be pushed by the pressing member. The term triangular shape here may also be a generally triangular shape that is not a precise triangular shape.

In the vehicle front structure described above, the pressing member may be configured to be detachable from the wall-like member.

According to the vehicle front structure having this structure, the pressing member is configured to be detachable from the wall-like member, so the pressing member is able to be arranged without making the structure of the wall-like member complex. Also, the rigidity and shape of the pressing member may be set as appropriate.

Also, in the vehicle front structure described above, the pressing member may be assembled to the wall-like member by pawl-engagement.

With the vehicle front structure having this structure, the pressing member is assembled to the wall-like member by pawl-engagement, so the assemblability thereof is able to be improved.

Also, in the vehicle front structure described above, a recessed portion that is arc-shaped when viewed from a vehicle width direction may be formed on a wall portion of the pressing member. The wall portion faces the rear in the vehicle longitudinal direction.

With the vehicle front structure having this structure, a recessed portion that is arc-shaped when viewed from the vehicle width direction may be formed on a wall portion of the pressing member that faces the rear, in the vehicle longitudinal direction, so even if there is variation in the position of the cable member with respect to the pressing member in the vehicle vertical direction, the pressing member is able to push the cable member.

Also, in the vehicle front structure described above, the wall-like member may be a fan shroud that rotatably supports a fan that cools a radiator.

With the vehicle front structure having this structure, the wall-like member is a fan shroud that rotatably supports a fan that cools a radiator, so the number of parts is able to be reduced, thus enabling manufacturing costs to be reduced.

In this way, the vehicle front structure of the invention is able to shorten the time that it takes to inhibit backward movement of a clutch pedal immediately after a load is input from the front of the vehicle in the vehicle longitudinal direction.

BRIEF DESCRIPTION OF THE DRAWINGS

The features, advantages, and technical and industrial significance of this invention will be described in the following detailed description of example embodiments of the invention with reference to the accompanying drawings, in which like numerals denote like elements, and wherein.

DETAILED DESCRIPTION OF EMBODIMENTS

Hereinafter, example embodiments of the invention will be described in detail with reference to the accompanying drawings. In the drawings, the arrow UP indicates a direction up with respect to a vehicle (i.e., a vehicle body), the arrow FR indicates a direction toward the front of the vehicle, the arrow RE indicates a direction toward the rear of the vehicle, and the arrow OUT indicates a direction toward the outside in the vehicle width direction. Also, when directions such as front and rear (back), up and down, and left and right are used in the description below, these will indicate front and rear in a vehicle longitudinal direction, up and down in a vehicle height direction (i.e., the vehicle vertical direction), and left and right in a vehicle lateral direction (i.e., a vehicle width direction), unless otherwise specified.

Figure 1:
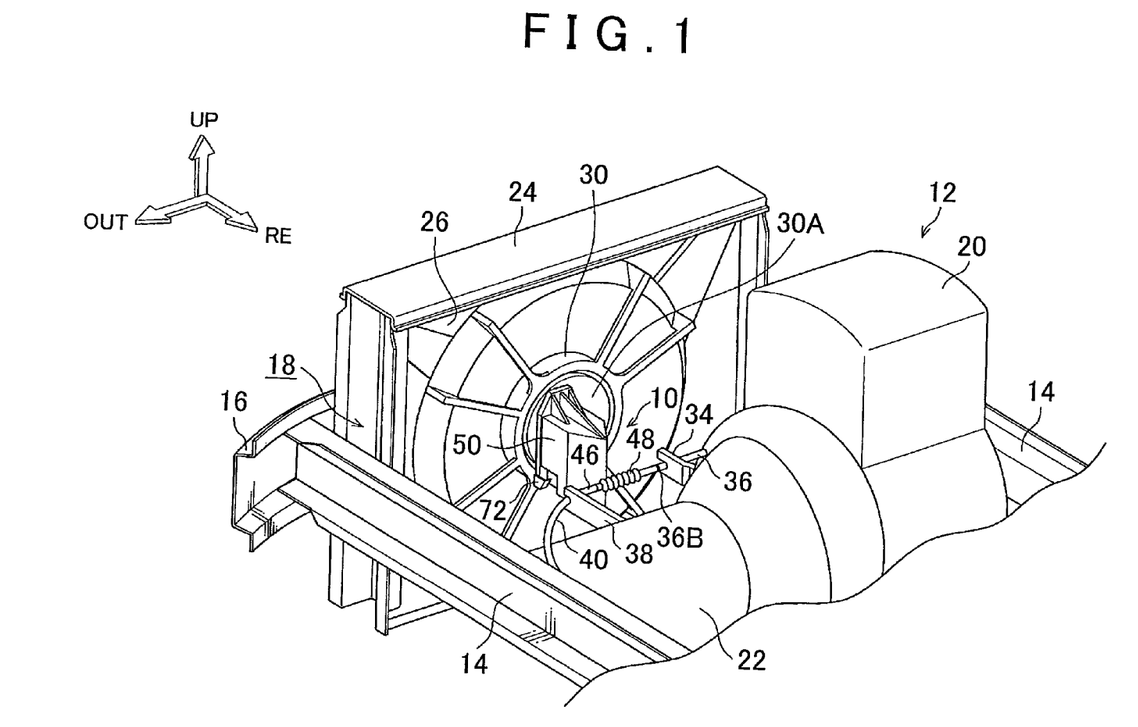
FIG. 1 is a perspective view of the overall structure of a vehicle front structure according to one example embodiment of the invention.

As shown in FIG. 1, a pair of left and right front side members 14, the length direction of which is the vehicle longitudinal direction, is arranged with one on the left side of the vehicle in the vehicle width direction and the other on the other on the right side of the vehicle in the vehicle width direction, a predetermined distance apart from each other. Also, a front bumper reinforcement 16, the length direction of which is the vehicle width direction, is attached so as to connect front end portions, in the vehicle longitudinal direction, of the front side members 14 together.

Also, a space formed between the front bumper reinforcement 16 and each of the front side members 14 serves as an engine compartment 18, and an engine 20 is arranged on the right side, in the vehicle width direction, in this engine compartment 18. Also, a case 22 that includes a transmission and the like is arranged on the left side, in the vehicle width direction, in the engine compartment 18. The engine 20 and the case 22 are disposed adjacent in the vehicle width direction between the left and right front side members 14.

A radiator support member 24 is arranged in front, in the vehicle longitudinal direction, of the engine 20. A radiator 26 is arranged on the lower side of this radiator support member 24. Also, a fan shroud 30 that serves as a wall-like member that rotatably supports a cooling fan 28 (see FIGS. 4 and 5 and the like) that cools the radiator 26 is arranged to the rear, in the vehicle longitudinal direction, of the radiator 26.

A driving motor 29 (see FIG. 2) that rotatably drives the cooling fan 28 is housed in a center portion of this fan shroud 30 (i.e., a rotational axis portion of the cooling fan 28). A rear side, in the vehicle longitudinal direction, of this driving motor 29 is covered by a motor cover that forms a portion of a wall surface 30A that faces the rear side, in the vehicle longitudinal direction, of the fan shroud 30.

Also, a clutch cable 40 that is a cable member is arranged so that it runs across in back, in the vehicle longitudinal direction, of the fan shroud 30, between the fan shroud 30 and the engine 20. The cable member of the invention is not limited to the clutch cable 40. For example, the cable member may also include a cord-like member, not shown, and the like that is connected to a front end portion, in the vehicle longitudinal direction, of the clutch cable 40. In this case, the cord-like member and the like may be pushed by a pressing member 50 that will be described later, so that it detaches from a retaining member 36 that will also be described later.

A rear end portion in the vehicle longitudinal direction (hereinafter simply referred to as "rear end portion") 42A that is one end portion of the clutch cable 40 is connected to a clutch pedal 32 (see FIG. 6). A front end portion in the vehicle longitudinal direction (hereinafter simply referred to as "front end portion") 42B that is the other end portion of the clutch cable 40 is detachably retained (connected) by crimping or the like to the retaining member 36 that is arranged between the engine 20 and the fan shroud 30 (see FIG. 5).

More specifically, a clutch, not shown, that selectively transmits and interrupts the transmission of power from the engine 20 to a drive train is provided in the transmission. A movable bracket 34 provided so as to enable operation of the clutch protrudes from an operation hole, not shown, formed in an outer wall portion of the case 22, toward the front in the vehicle longitudinal direction.

The movable bracket 34 is formed in a generally flat plate shape. This movable bracket 34 is urged toward the outside in the vehicle width direction by an urging member, not shown, and configured to be able to rock toward the inside in the vehicle width direction. Also, a substantially center portion in the axial direction of the retaining member 36 that has a round cylindrical shape with an axial direction that is the vehicle width direction is attached and fixed to a front end portion, in the vehicle longitudinal direction, of the movable bracket 34 (see FIG. 5).

Also, a fixing bracket 38 that extends toward the front in the vehicle longitudinal direction is attached to the outer wall portion of the case 22. This fixing bracket 38 is also formed in a generally flat plate shape, and a substantially center portion in the axial direction of a cylindrical support member 46, the axial direction of which is the vehicle width direction, is attached and fixed to the front end portion, in the vehicle longitudinal direction, of this fixing bracket 38. Also, the clutch cable 40 is inserted through this support member 46 (see FIG. 5).

Figure 5:
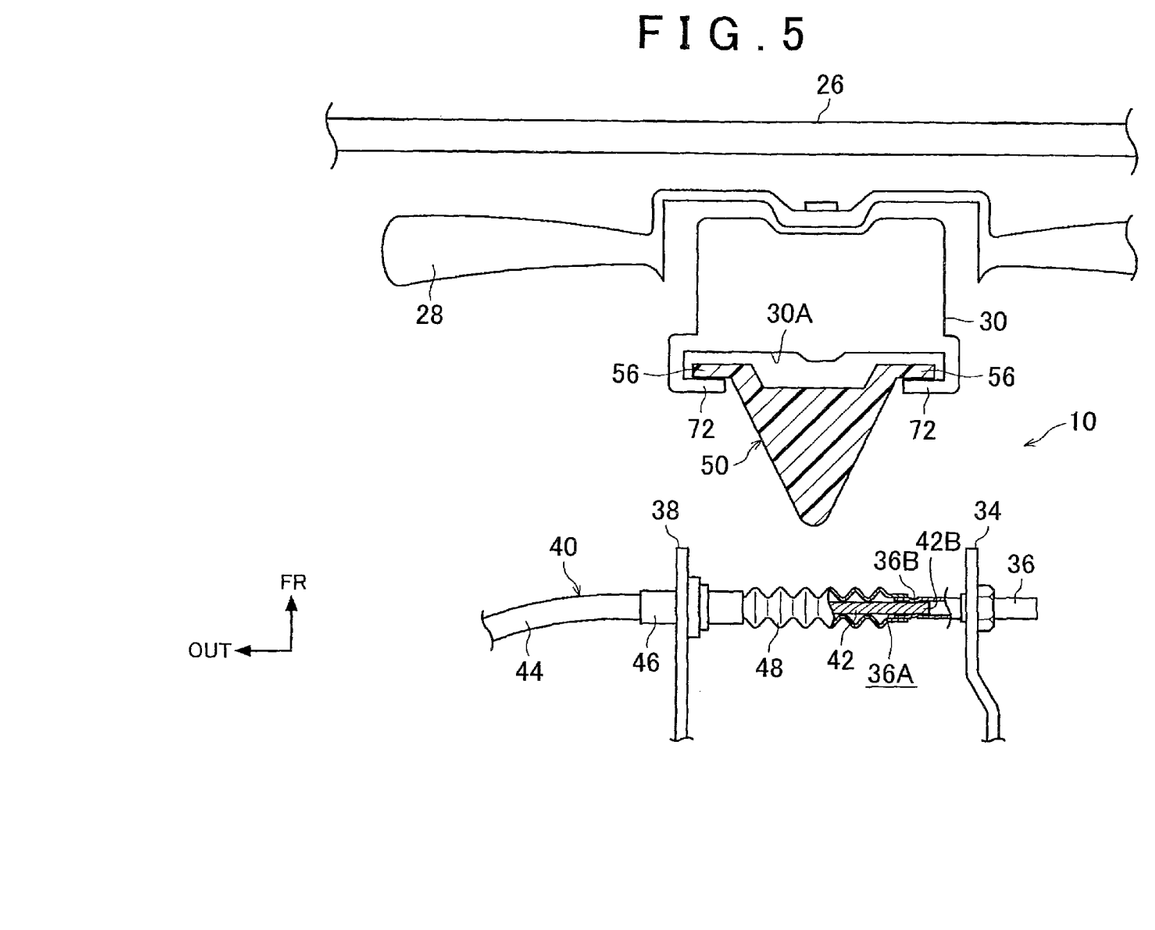
FIG. 5 is a plan view of a partial cross-section of the pressing member and a clutch cable before a frontal collision.

As shown in FIG. 5, the clutch cable 40 is formed by a wire 42 that is pulled at a predetermined tension, and an exterior tube 44 that covers this wire 42. The front end portion, in the vehicle longitudinal direction, of the exterior tube 44 is attached and fixed to an inner wall of the support member 46. Also, the wire 42 that is between the support member 46 and the retaining member 36 is covered by a bellows-like exterior portion 48.

Also, as shown by FIG. 5, the front end portion 42B of the wire 42 is inserted into an opening 36A that faces the inside, in the vehicle width direction, of the retaining member 36, and this opening 36A is attached (i.e., held) to the retaining member 36 by being crimped (i.e., crushed). That is, a crimped portion 36B for holding the front end portion 42B of the wire 42 is formed all the way along in the circumferential direction.

Figure 6:
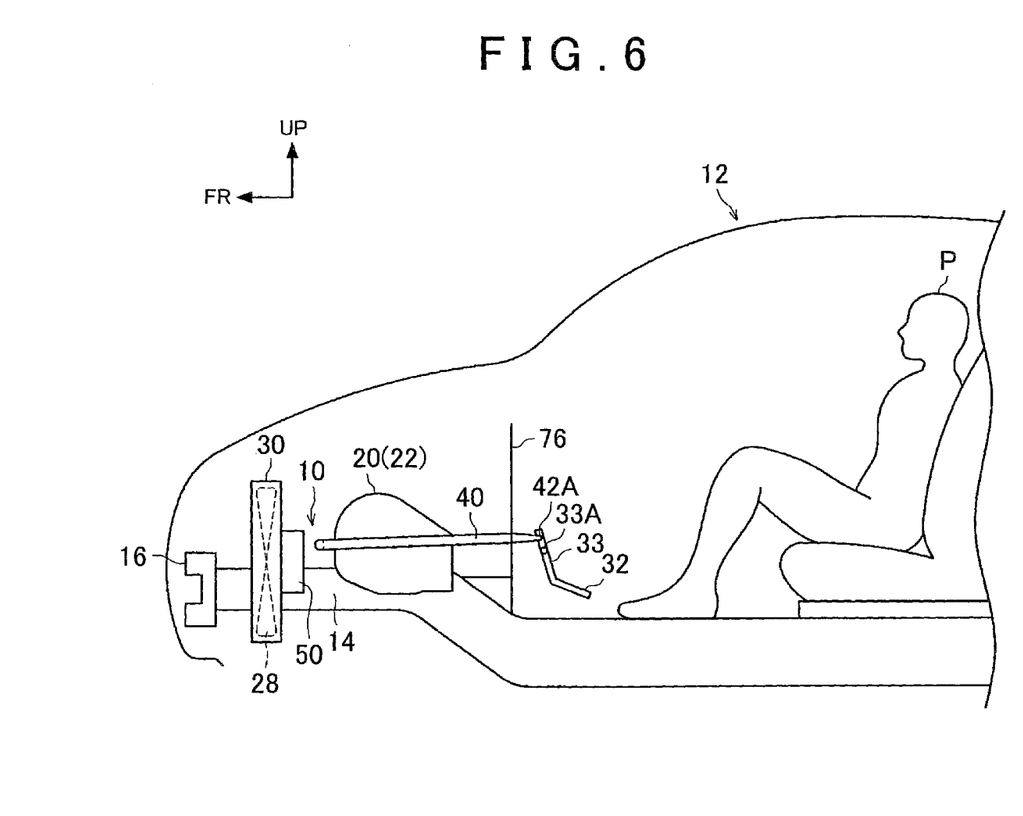
FIG. 6 is a side view showing a frame format of the pressing member, the clutch cable, and a clutch pedal before a frontal collision.

Moreover, as shown in the frame format in FIG. 6, the rear end portion 42A of the wire 42 is operatively connected to an upper end portion of a pedal bracket 33 of the clutch pedal 32, through a through-hole, not shown, formed in a dash panel 76. When an occupant P depresses the clutch pedal 32 (i.e., when the clutch pedal 32 is pivoted toward the front in the vehicle longitudinal direction about a fulcrum 33A formed at a midway portion of the pedal bracket 33), the wire 42 is pulled toward the rear in the vehicle longitudinal direction.

That is, when the occupant P depresses the clutch pedal 32, the movable bracket 34 rocks toward the inside in the vehicle width direction against the urging force of the urging member, and the clutch releases. Therefore, the bellows-like exterior portion 48 covers the wire 42 between the support member 46 and the retaining member 36, and this exterior portion 48 will not impede the movable bracket 34 from rocking toward the inside in the vehicle width direction.

Figure 2:
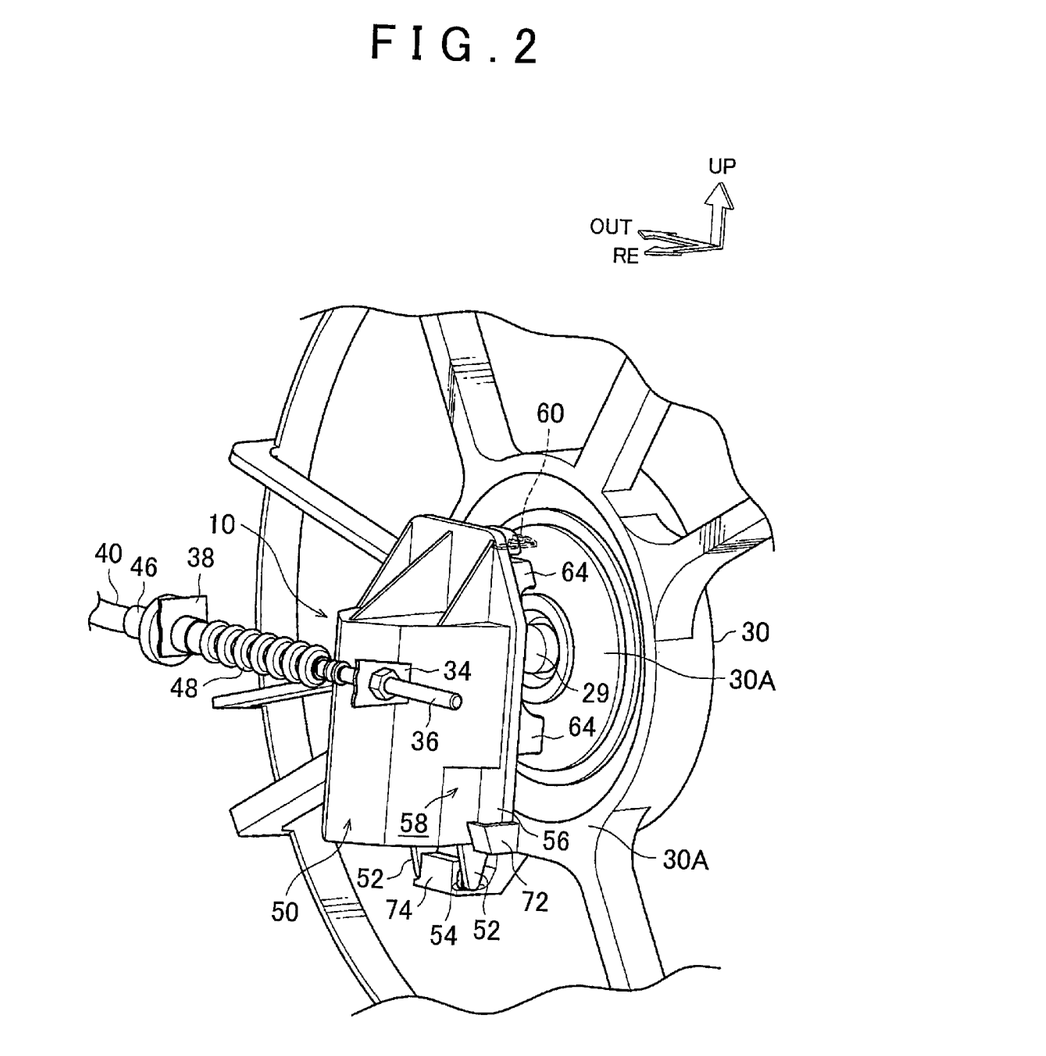
FIG. 2 is an enlarged perspective view of the overall structure of the vehicle front structure according to the example embodiment.

Also, as shown in FIGS. 1 and 2, the pressing member 50 has a shape that protrudes toward the rear in the vehicle longitudinal direction is detachably provided on the wall surface 30A (the motor cover) that faces the rear, in the vehicle longitudinal direction, of the fan shroud 30. This pressing member 50 is made of resin material such as polypropylene (PP+GF), polyamide (PA), or polyacetal (POM) or the like, with glass fiber mixed in, and is formed in a generally triangular-shape in a top sectional view, with a rear portion thereof, in the vehicle longitudinal direction, being the apex (see FIG. 5).

Figure 3:
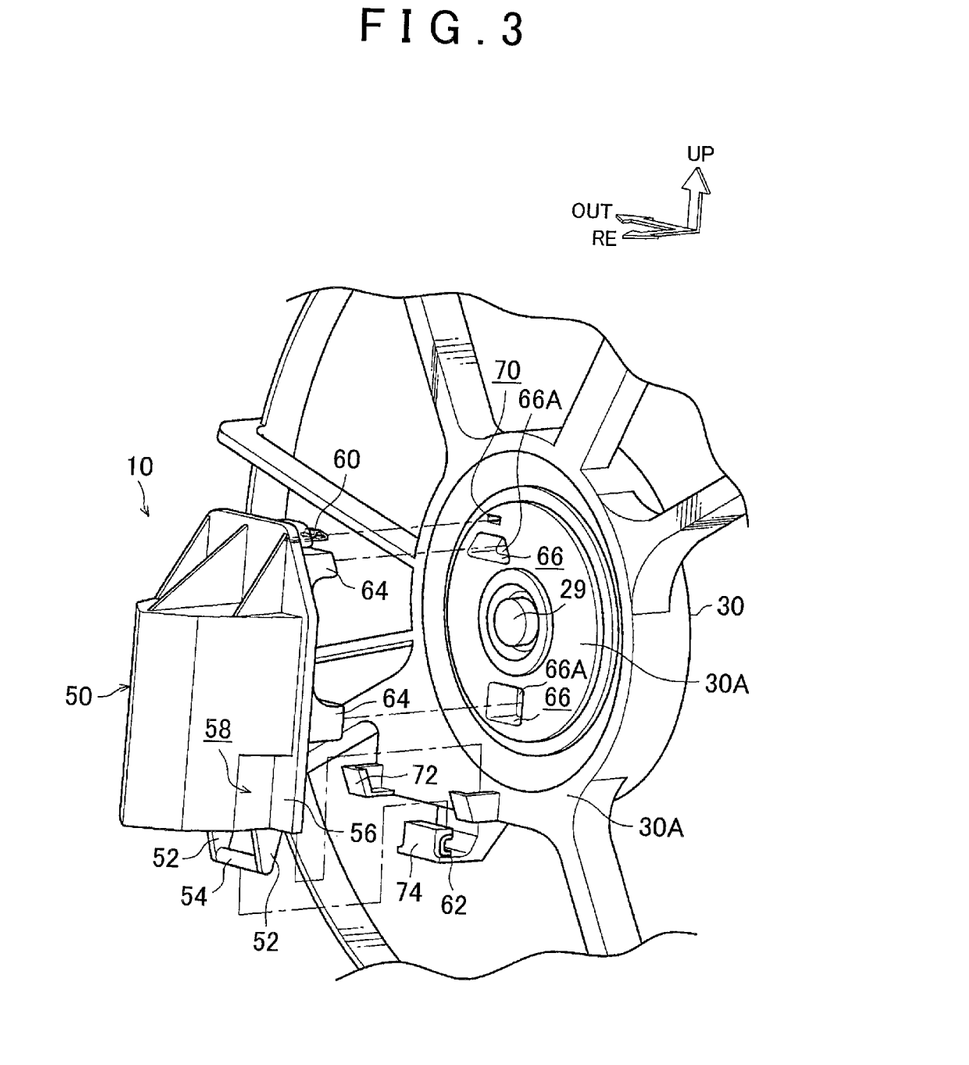
FIG. 3 is a partial perspective view of a structure for assembling a pressing member to a fan shroud.
Figure 4:
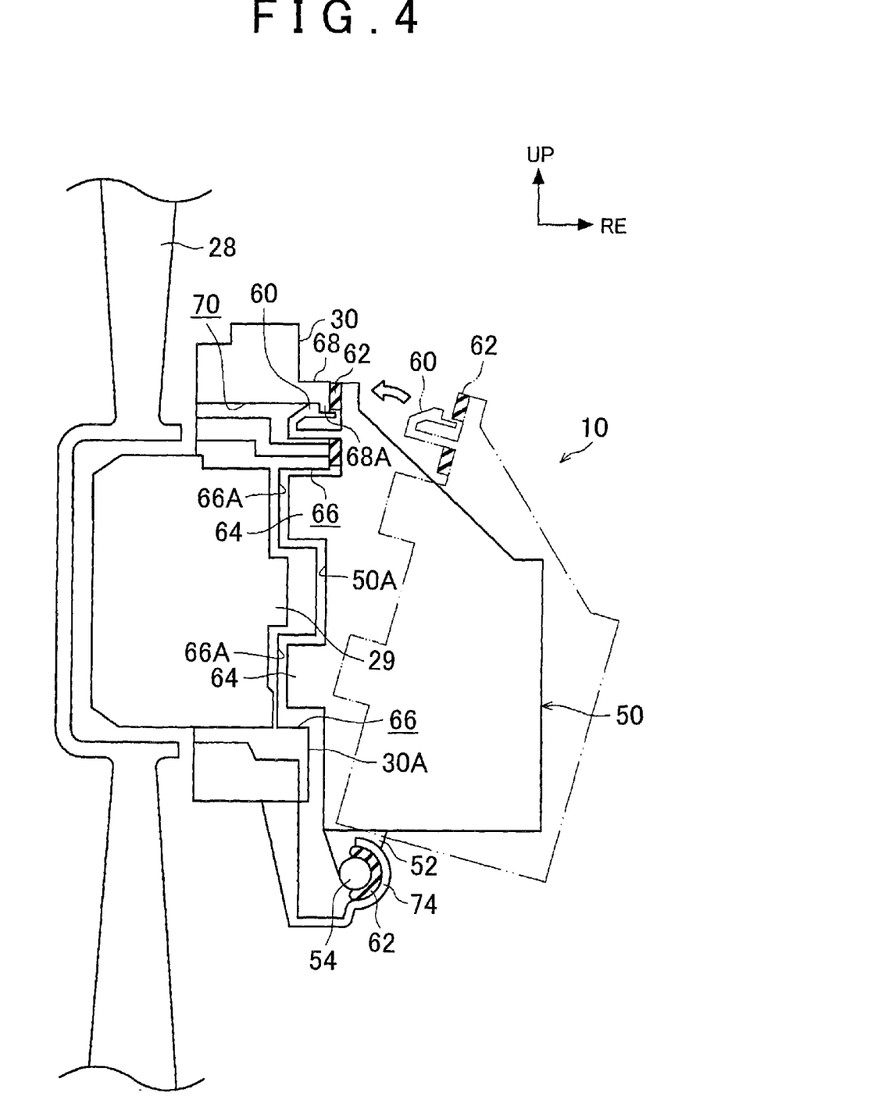
FIG. 4 is a side view of an operation when assembling the pressing member to the fan shroud.

Also, this pressing member 50 is assembled (i.e., attached) by pawl-engagement with the wall surface 30A so as to cover the center portion (i.e., the center portion in the vehicle width direction, including the rotational axis portion of the cooling fan 28) of the wall surface 30A of the fan shroud 30. More specifically, as shown in FIGS. 3 and 4, a pair of left and right support plates 52, each of which is generally shaped like an isosceles triangle in a side view when viewed from the vehicle width direction, is integrally provided protruding downward with respect to the vehicle body, on a lower end surface of the pressing member 50.

Also, a round columnar engaging portion 54 is integrally provided extending, with the axial direction thereof being the vehicle width direction, between the lower end portions of the pair of left and right support plates 52 so as to connect the support plates 52 together. This engaging portion 54 is the position reference when assembling the pressing member 50 to the wall surface 30A. Also, a flange portion 56 is formed by forming a rectangular cutout portion 58 in both the left and right lower portions of the pressing member 50.

A hook-shaped pawl portion 60 that is able to flexibly (i.e., elastically) deform downward is integrally provided protruding toward the front, in the vehicle longitudinal direction, on an upper end portion of the pressing member 50. Also, a sponge-like cushion member 62 is affixed to a portion (around the pawl portion 60) of a wall surface 50A facing the front side, in the vehicle longitudinal direction, of the pressing member 50 where this pawl portion 60 is provided protruding.

Also, a plurality (two are shown in the drawing) of protruding portions 64 that protrude toward the front in the vehicle longitudinal direction are integrally formed spaced apart in the vehicle vertical direction, on the wall surface 50A facing the front side, in the vehicle longitudinal direction, of the pressing member 50 below the pawl portion 60. Also, a plurality (two are shown in the drawing) of recessed portions 66 into which the protruding portions 64 are inserted are formed spaced apart in the vehicle vertical direction, on the wall surface 30A (the motor cover) facing the rear side, in the vehicle longitudinal direction, of the fan shroud 30. When inserted into the recessed portions 66, the protruding portions 64 will not abut against bottom surfaces 66A of the recessed portions 66 (see FIG. 4).

Also, a retaining hole 70 that serves as a retaining portion into which the pawl portion 60 is inserted, and by which the pawl portion 60 retained, is formed in the wall surface 30A (the motor cover) facing the rear side, in the vehicle longitudinal direction, of the fan shroud 30. A downward-facing protruding portion 68A is integrally formed on an upper edge portion 68 that forms this retaining hole 70. When the pawl portion 60 is inserted into the retaining hole 70 while elastically deforming downward so as to ride over this protruding portion 68A, and then returns to its original position after riding over the protruding portion 68A, the pawl portion 60 is retained by this protruding portion 68A.

Furthermore, as shown in FIGS. 2 and 3, a pair of left and right accommodating portions 72 that accommodate the flange portions 56 that are formed on both the left and right lower portions of the pressing member 50 are integrally formed on the wall surface 30A facing the rear side, in the vehicle longitudinal direction, of the fan shroud 30 (i.e., not the motor cover). These accommodating portions 72 are designed to prevent the pressing member 50 from slipping down, and gaps that are greater than the plate thickness of the flange portions 56 are formed between these accommodating portions 72 and the wall surface 30A (in the vehicle longitudinal direction).

An engagable portion 74 with which the engaging portion 54 engages is integrally provided extending from a lower portion of the wall surface 30A between the pair of left and right accommodating portions 72. This engagable portion 74 is formed in a generally semicircular shape in the side sectional view shown in FIG. 4. The sponge-like cushion member 62 is affixed along this generally semicircular shape on the inside of the engagable portion 74. Therefore, when assembling the pressing member 50 to the wall surface 30A of the fan shroud 30, the assembly process is as described below.

That is, the engaging portion 54 of the pressing member 50 is engaged with the engagable portion 74 while the flange portions 56 of the pressing member 50 are accommodated in the accommodating portions 72. Next, the protruding portions 64 are inserted into the recessed portions 66 while bringing (i.e., pivoting) the upper end portion side of the pressing member 50 close to the wall surface 30A (the motor cover) of the fan shroud 30, with the engaging portion 54 (i.e., the engagable portion 74) as the pivot spindle. Then, the pawl portion 60 that is provided protruding from the upper end portion of the pressing member 50 is inserted into the retaining hole 70, and the pawl portion 60 is retained by the protruding portion 68A.

As a result, the pressing member 50 is able to be assembled to the wall surface 30A (including the motor cover) that faces the rear side, in the vehicle longitudinal direction, of the fan shroud 30. The cushion member 62 is affixed to the engagable portion 74 and the portion of the pressing member 50 around the pawl portion 60, and the protruding portions 64 do not abut against the bottom surfaces 66A inside the recessed portions 66, so even if the vehicle vibrates when running, abnormal noise produced by the assembled portion of the pressing member 50 and the fan shroud 30 is able to be reduced.

In this way, the pressing member 50 that has been assembled to the wall surface 30A of the fan shroud 30 faces the clutch cable 40 (i.e., the exterior portion 48) between the movable bracket 34 and the fixing bracket 38, as shown in FIGS. 1, 2, and 5. Also, when a load is input to this pressing member 50 from the front of the vehicle in the vehicle longitudinal direction, such as when the vehicle is involved in a frontal collision or the like, the pressing member 50 will move toward the rear in the vehicle longitudinal direction and push the clutch cable 40 toward the rear in the vehicle longitudinal direction, thereby detaching the front end portion 42B of the wire 42 from the retaining member 36.

That is, the front end portion 42B of the wire 42 is connected (i.e., held) to the opening 36A of the retaining member 36 only by the crimped portion 36B. Therefore, if this wire 42 is pulled away from the retaining member 36 (i.e., the opening 36A) by a force equal to or greater than a predetermined value, the front end portion 42B will detach from the crimped portion 36B of the retaining member 36. That is, the pressing member 50 is configured such that, when a load is input to the pressing member 50 from the front of the vehicle in the vehicle longitudinal direction, a pulling force of equal to or greater than the predetermined value is able to be applied to the wire 42 (i.e., the clutch cable 40).

Next, the operation of the vehicle front portion 10 that is provided with the clutch cable 40 and the pressing member 50 of the structure described above will be described. If the vehicle is involved in a frontal collision when traveling at a slow speed, the fan shroud 30 (i.e., the pressing member 50) will not move toward the rear in the vehicle longitudinal direction (i.e., the clutch pedal 32 will not move backward). Therefore, operation of the vehicle front portion 10 in this example embodiment when the vehicle is involved in a frontal collision when traveling at a high speed of equal to or greater than 64 km/h, for example, will be assumed.

Figure 10:
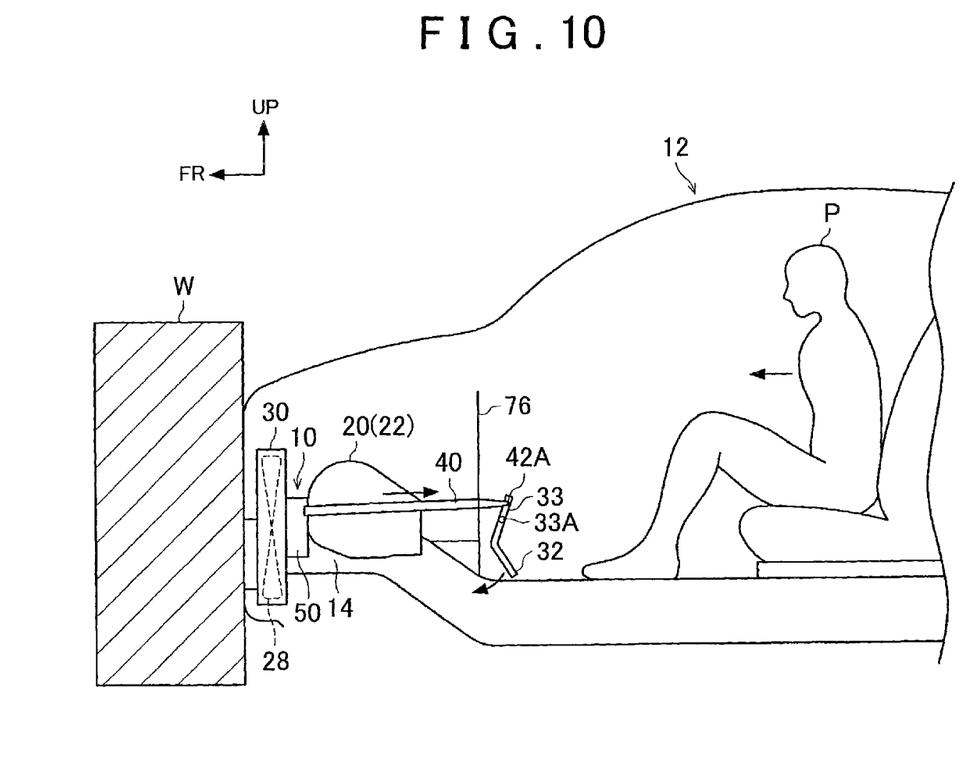
FIG. 10 is a side view showing a frame format of the pressing member, the clutch cable, and the clutch pedal immediately after a frontal collision.

When the vehicle (i.e., a vehicle body 12) is involved in a frontal collision (either a full frontal collision or an offset collision) with an obstacle W (see FIGS. 8 and 10) when traveling at a high speed of equal to or greater than 64 km/h, the front bumper reinforcement 16 moves largely toward the rear in the vehicle longitudinal direction, and the pressing member 50 moves toward the rear in the vehicle longitudinal direction via the radiator 26 (i.e., the radiator support member 24) and the fan shroud 30.

Figure 7:
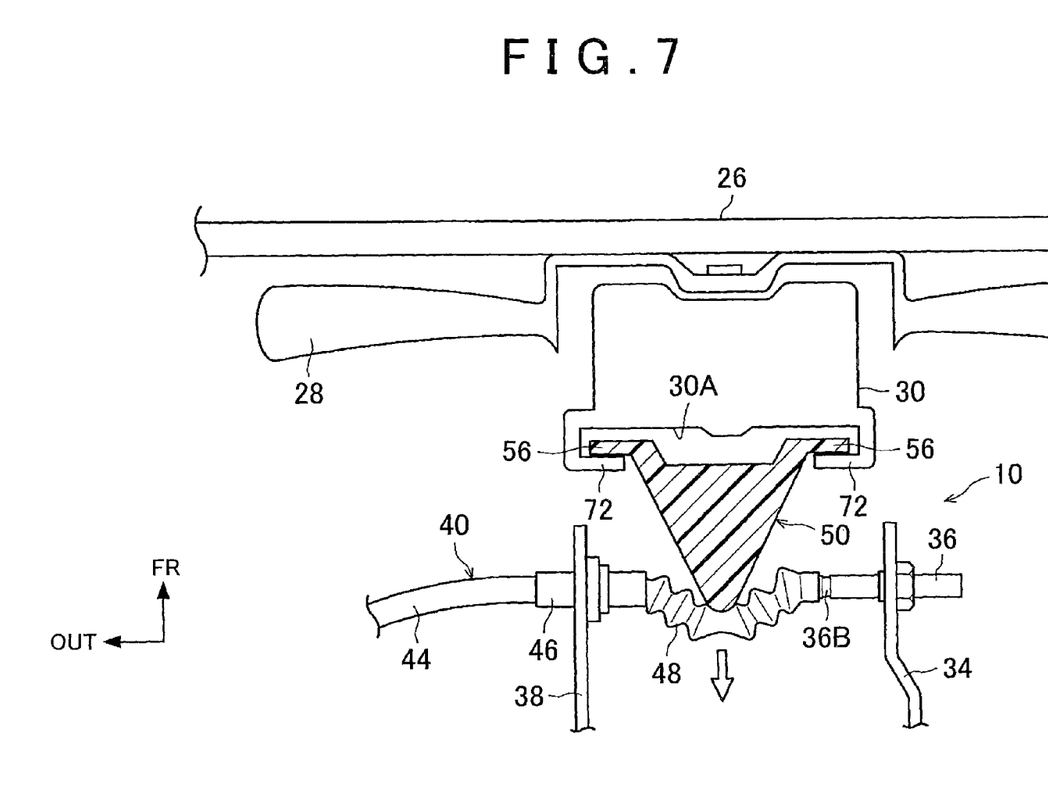
FIG. 7 is a plan view of a partial cross-section of the pressing member and the clutch cable immediately after a frontal collision.
Figure 8:
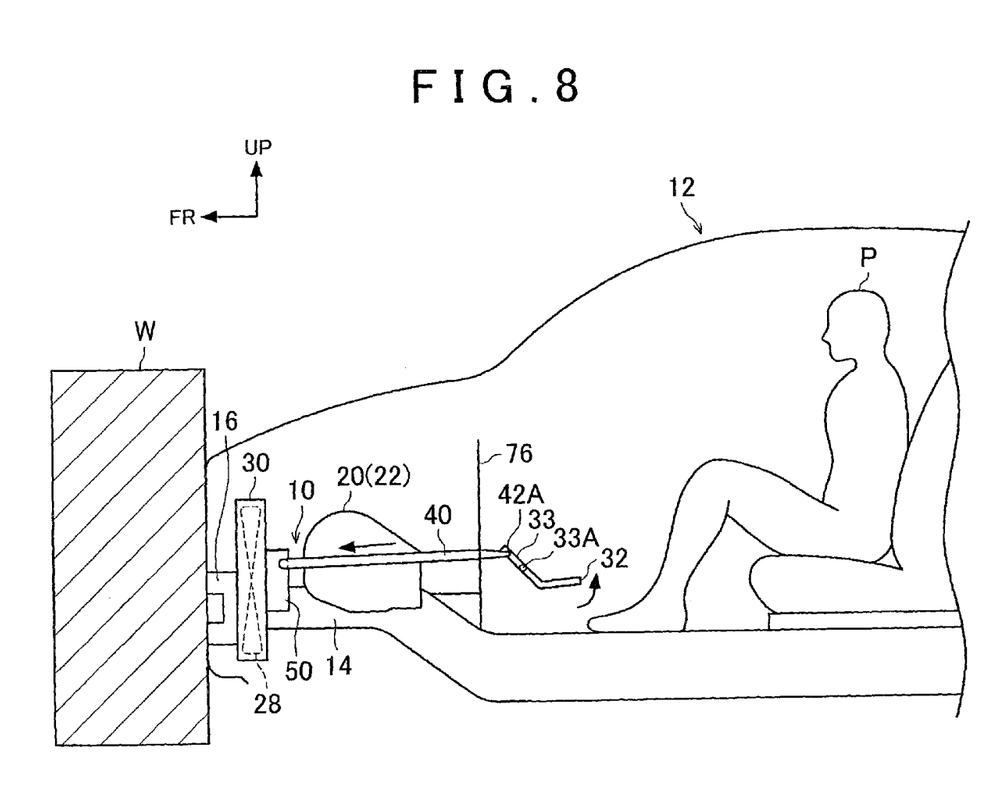
FIG. 8 is a side view showing a frame format of the pressing member, the clutch cable, and the clutch pedal immediately after a frontal collision.

When this happens, the pressing member 50 pushes the clutch cable 40 toward the rear in the vehicle longitudinal direction, as shown in FIG. 7. More specifically, the pressing member 50 pushes the exterior portion 48 of the clutch cable 40 that is between the movable bracket 34 and the fixing bracket 38 toward the rear in the vehicle longitudinal direction. As a result, the wire 42 is pulled relatively toward the front in the vehicle longitudinal direction, so the clutch pedal 32 instantaneously (i.e., temporarily) moves toward the rear (i.e., moves backward) in the vehicle longitudinal direction, as shown in FIG. 8.

Figure 9:
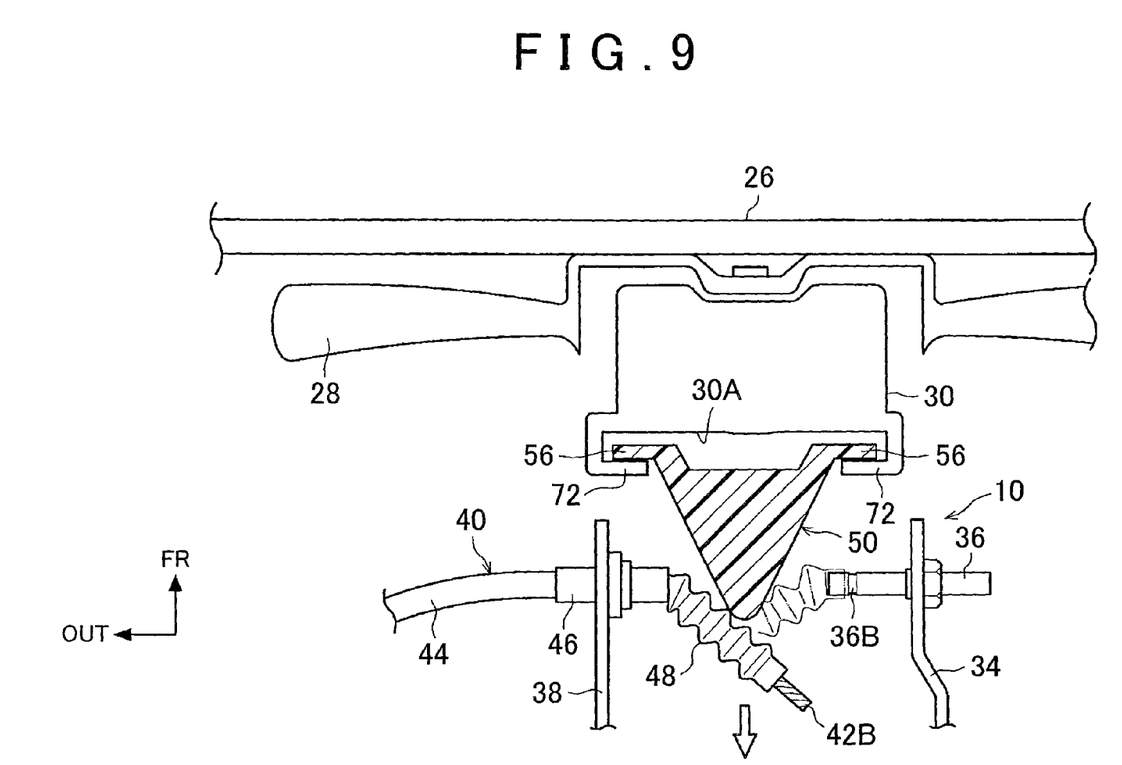
FIG. 9 is a plan view of a partial cross-section of the pressing member and the clutch cable immediately after a frontal collision.

Also, when the exterior portion 48 of the clutch cable 40 is pushed even farther toward the rear in the vehicle longitudinal direction by the pressing member 50, the front end portion 42B of the wire 42 detaches (i.e., is freed) from the crimped portion 36B of the retaining member 36, as shown in FIG. 9. When this happens, the wire 42 becomes free (because there is no tension acting on the wire 42), so the clutch pedal 32 moves toward the front in the vehicle longitudinal direction (i.e., toward the dash panel 76 side) due to its own weight (i.e., the clutch pedal 32 is inhibited from moving backward).

In this example embodiment, the operation of the clutch pedal 32 described above is performed immediately after a load is input (i.e., in the early stages of a collision). That is, in this example embodiment, the timing at which the occupant P moves toward the front in the vehicle longitudinal direction from inertia force when a frontal collision occurs is after the foregoing operation of the clutch pedal 32 is complete (or almost simultaneous with the completion of the operation).

Accordingly, the time from immediately after a load is input from the front of the vehicle in the vehicle longitudinal direction until backward movement of the clutch pedal 32 is inhibited (i.e., until the clutch pedal 32 is moved toward the dash panel 76 side that is toward the front in the vehicle longitudinal direction) is able to be shortened compared with the related art, and the clutch pedal 32 is able to be prevented from striking a leg of the occupant P.

Moreover, this pressing member 50 is formed in a generally triangular shape in a top sectional view with the rear portion thereof, in the vehicle longitudinal direction, being the apex, so even if the direction in which the pressing member 50 moves toward the rear (i.e., moves backward) in the vehicle longitudinal direction varies depending on the manner in which the frontal collision occurs (i.e., the manner in which the load is input from the front of the vehicle in the vehicle longitudinal direction), the clutch cable 40 is able to be reliably pushed by the pressing member 50.

Figure 11:
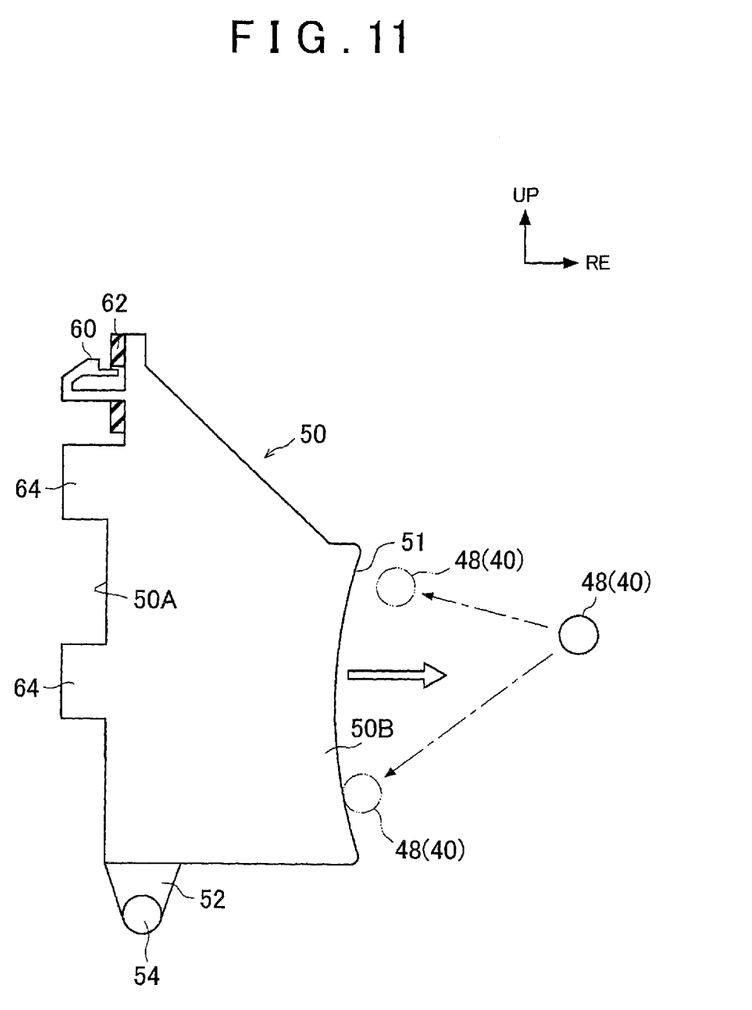
FIG. 11 is a side view of a modified example of the pressing member.

The shape of the pressing member 50 may also be the shape shown in FIG. 11. That is, a curved recessed portion 51 that is arc-shaped when viewed from the vehicle width direction may be formed on an apex wall portion 50B that faces the rear in the vehicle longitudinal direction, i.e., the apex portion of the pressing member 50. When the curved recessed portion 51 is formed on the apex wall portion 50B of the pressing member 50 in this way, even if there is variation in the position of the clutch cable 40 with respect to the pressing member 50 in the relatively vehicle vertical direction, the pressing member 50 is able to reliably catch the clutch cable 40, and therefore is able to reliably push the clutch cable 40.

Also, the pressing member 50 is configured so as to be able to detach from the fan shroud 30. Therefore, the pressing member 50 is able to be arranged without making the structure of the fan shroud 30 complex. Furthermore, the pressing member 50 is assembled to the fan shroud 30 by pawl-engagement. Therefore, assemblability of the pressing member 50 to the fan shroud 30 is able to be improved.

Also, the pressing member 50 is a structure that is detachably provided on the wall surface 30A that faces the rear side, in the vehicle longitudinal direction, of the existing fan shroud 30. Therefore, compared with a structure in which a wall-like member for providing the pressing member 50 is arranged on the vehicle body 12, the number of parts can be reduced, so the manufacturing cost is able to be reduced.

The pressing member 50 is not limited to a structure that is detachably provided on the wall surface 30A that faces the rear side, in the vehicle longitudinal direction, of the fan shroud 30. Alternatively, the pressing member 50 may be a structure that is integrally formed with the wall surface 30A. In this case, the number of parts is able to be reduced even more, so the assembly cost is able to be reduced.

However, in this case, when mounting the engine 20 and the transmission (i.e., the case 22) in the engine compartment 18, or when attaching a length adjusting jig of the clutch cable 40, not shown, the pressing member 50 may get in the way. Therefore, the pressing member 50 is preferably formed as a separate body from the fan shroud 30, and detachably provided on the fan shroud 30. Forming the pressing member 50 as a separate body from the fan shroud 30 is also advantageous in that the rigidity and shape of the pressing member 50 are able to be set as appropriate (i.e., as desired).

Also, the pressing member 50 may be made of metal material (steel plate), for example, instead of resin material. In this case, the strength of the pressing member 50 is able to be improved, and the manufacturing cost is able to be reduced compared with when the pressing member 50 is made of resin material. Also in this case, the pressing member 50 is attached to the wall surface 30A of the fan shroud 30 by a bolt and a nut, not shown, instead of by pawl-engagement.

In addition, the pressing member 50 is provided covering the center portion of the wall surface 30A of the fan shroud 30. That is, the pressing member 50 covers the driving motor 29 (i.e., the motor cover) that rotatably drives the cooling fan 28. Therefore, rainwater and muddy water and the like are able to be inhibited from getting on the driving motor 29 by the pressing member 50. As a result, the possibility of failure occurring in the driving motor 29 is able to be reduced.

Also, the pressing member 50 is arranged between the driving motor 29 (i.e., the motor cover) that rotatably drives the cooling fan 28, and the engine 20 and the transmission (i.e., the case 22). Therefore, it is possible to shield the driving motor 29 from heat generated by the engine 20 and the transmission (i.e., the case 22). Thus, the life of the driving motor 29 is able to be extended.

While the vehicle front portion 10 according to the example embodiment has been described with reference to the drawings, the vehicle front portion 10 according to the example embodiment is not limited to the drawings. That is, appropriate design changes are also possible without departing from the scope of the invention. For example, a wall-like member for detachably providing the pressing member 50 is not limited to the fan shroud 30, but may also be another existing wall-like member that faces the clutch cable 40 on the front side thereof in the vehicle longitudinal direction.

The invention claimed is:

1. A vehicle front structure comprising:
   a cable member, one end portion of which is connected to a clutch pedal and the other end portion of which is detachably held by a retaining member arranged between an engine and a wall member arranged in front, in a vehicle longitudinal direction, of the engine, the cable member being arranged running across in back, in the vehicle longitudinal direction, of the wall member; and
   a protruding pressing member that is provided on a wall surface that faces a rear, in the vehicle longitudinal direction, of the wall member so as to face the cable member, and that detaches the other end portion of the cable member from the retaining member by pushing the cable member toward the rear in the vehicle longitudinal direction when a load is input from the front of the vehicle in the vehicle longitudinal direction.

2. The vehicle front structure according to claim 1, wherein the pressing member is formed in a triangular shape in a top sectional view, with a rear portion thereof in the vehicle longitudinal direction being an apex.

3. The vehicle front structure according to claim 1, wherein the pressing member is integrally formed with the wall member.

4. The vehicle front structure according to claim 1, wherein the pressing member is configured to be detachable from the wall member.

5. The vehicle front structure according to claim 4, wherein the pressing member is assembled to the wall member by pawl-engagement.

6. The vehicle front structure according to claim 1, wherein a recessed portion that is arc-shaped when viewed from a vehicle width direction is formed on a wall portion of the pressing member, the wall portion facing the rear in the vehicle longitudinal direction.

7. The vehicle front structure according to claim 1, wherein the wall member is a fan shroud that rotatably supports a fan that cools a radiator.

8. The vehicle front structure according to claim 7, wherein the pressing member is attached so as to cover a center portion in the vehicle width direction of the fan shroud, including a rotational axis of the fan.

9. The vehicle front structure according to claim 1, further comprising a movable bracket that is connected to a transmission provided with a clutch that selectively transmits and interrupts transmission of power from the engine to a drive train, and that operates the clutch, wherein the movable bracket is attached to the retaining member.

* * * * *